3,594,483
METHOD OF FUNGUS CONTROL EMPLOYING CERTAIN FLUORINE-CONTAINING SULFIDES
Edward L. Mutsch, Woodbury Township, Washington County, and Jerold W. Bushong, North Oaks, Minn., assignors to Minnesota Mining and Manufacturing Company, St. Paul, Minn.
No Drawing. Filed Apr. 29, 1968, Ser. No. 725,125
Int. Cl. A01n 9/12
U.S. Cl. 424—337　　　　　8 Claims

ABSTRACT OF THE DISCLOSURE

Method for inhibiting the growth of fungi, particularly *Sclerotium rolfsii*, by contacting the fungi with a compound of the formula:

Ar—alk—S—CH$_2$—(CF$_2$)$_m$—X wherein Ar is phenyl, substituted phenyl, naphthyl or substituted naphthyl, the substituents being lower alkyl, lower alkoxy, halo or nitro; —alk— is an alkylene group, being straight or branched chain, or cyclic and containing from 1 to 6 carbon atoms; $m$ is an integer of from 1 to 8, preferably 2, 3 or 4 and X is hydrogen or fluorine.

BACKGROUND OF THE INVENTION

The present invention relates to a novel method for inhibiting the growth of fungi comprising treating them with a composition containing a fluorine-containing sulfide compound represented by the structural formula:

Ar—alk—S—CH$_2$—(CF$_2$)$_m$—X wherein Ar is phenyl, substituted phenyl, naphthyl or substituted naphthyl, the substituents being lower alkyl, lower alkoxy, halo or nitro; —alk— is an alkylene group, being straight or branched chain or cyclic and containing from 1 to 6 carbon atoms, $m$ is an integer of from 1 to 8, preferably 2, 3, or 4 and X is hydrogen or fluorine. These compounds are crystalline solids or viscous liquids which are somewhat soluble in many organic solvents. They are particularly adapted to be employed as active toxic constituents of compositions for the control of the fungus, *Sclerotium rolfsii*.

PRIOR ART

Fungicidal sulfides, e.g., bis(3-halo-2-chloropropenyl) sulfide are known (U.S. Pat. 2,908,717), as are fluoroalkyl sulfides having no stated biological activity, e.g., as in U.S. Pats. 3,006,964, 3,048,569 and 3,326,867. None of these, however, includes or suggests the incorporation of aryl or substituted aryl groups in conjunction with two methylene-fluoro-alkyl groups in the manner described herein.

SUMMARY OF THE INVENTION

The present invention, therefore, contemplates a process for controlling fungal pathogens often found in such plants as, for example, peanuts, carrots, cotton, tomatoes, beans and the like, particularly when the fungus is *Sclerotium rolfsii*.

The invention has in view a method for treating plants and seeds so as to effectively control fungal pathogens therein, by treating the plants with fungicidal compositions which include as active ingredients particular fluorine-containing sulfide compounds.

These compounds are conveniently prepared by reacting compounds of the structural formula:

Ar—alk—A with compounds of the structural formula:

B—CH$_2$(CF$_2$)$_m$X wherein A is —SM and B is a reactive halogen or a reactive ester of the alcohol HOCH$_2$(CF$_2$)$_n$X, or wherein A is a reactive halogen or a reactive ester of the alcohol Ar—alk—OH and B is —SM and wherein M is hydrogen or metal atom, e.g. Na$^+$, Ca$^{++}$, Cu$^{++}$, Cu$^+$ or K$^+$; Ar, alk, $m$ and X have the meanings described above.

The reaction is carried out in compatible solvents, preferably lower aliphatic alcohols; however inert organic solvents such as benzene, toluene, xylene or dioxane as well as dimethyl formamide and pyridine are also acceptable. The reaction temperature can be varied within a range of the order of 0° C. to 110° C. and is preferably between about 25° C. and 90° C.

Examples of the reactive esters referred to above are esters of inorganic and organic acids, e.g., aromatic, alkyl and haloalkyl sulfonic acids.

When M is hydrogen, it is preferable to carry out the reaction in the presence of an acid acceptor, e.g. a tertiary amine, Na$_2$CO$_3$, NaOH or KOH.

The active compounds can be dispersed in the usual fungicidal formulations, e.g., emulsifiable concentrates, spray powders, pastes, soluble powders, suspensions, dusts and granulates. Such formulations are prepared in known manner, for example, by extending the active ingredients with solvents and/or carriers, if desired with the use of emulsifiers and/or dispersing agents. Suitable auxiliaries for this purpose are mainly solvents, such as aromatics (e.g., xylene, benzene), chlorinated aromatics (e.g., chlorobenzenes), paraffins, (e.g., petroleum fractions), alcohols (e.g., methanol, butanol), amines, (e.g., ethanolamine, dimethyl formamide), and water; carriers such as natural rock flours (e.g., kaoline, aluminas, talc, chalk) and ground synthetic stone (e.g., highly dispersed silicic acid, silicates); emulsifiers, such as non-ionic and anionic emulsifiers (e.g., polyoxyethylene fatty acid esters, polyoxyethylene fatty alcohol ethers, alkylsulfonates and arylsulfonates), and dispersing agents such as lignin, sulfite waste liquors, and methyl cellulose.

The formulations generally contain between 0.1 and 95 percent and preferably between 1 and 90% by weight of active compounds and the active compounds defined above can be present in admixture with other known active ingredients.

Compositions containing compounds defined above can be sprayed on or mixed into the soil, or applied as a foliage spray. Soil applications are applied at or before planting, as a side dressing to living plants, in the row, or as a soil drench. The dosage should be of the order of 1 to 30 pounds of active compound per acre treated depending on method of application and soil type. Said compositions can also be used in seed treatments.

DETAILED DESCRIPTION OF THE INVENTION

The following detailed but non-limiting examples are provided in order to more clearly point out and define specific embodiments of the invention as well as the scope thereof.

EXAMPLE 1

A solution of 36 grams of 1,1,5-trihydroperfluoroamyl-trifluoromethanesulfonate in benzene was added to a solution of 6 grams of potassium hydroxide and 16 grams of o-chlorobenzylmercaptan in ethanol. The resulting solution was refluxed for two hours. The solution was then evaporated in vacuo and 200 ml. of water were added; the resulting mixture was extracted with 2×100 ml. of ether. The combined ether extracts were dried and evaporated in vacuo and the residue subjected to vacuum distillation. o-Chlorobenzyl 1,1,5-trihydroperfluoroamyl sulfide was collected, B.P. 78–82° C./0.12 mm.

*Analysis.*—Calculated for C$_{12}$H$_9$ClF$_8$S (percent): C, 38.7; H, 2.4. Found (percent): C, 38.9; H, 2.3.

The following are examples of compounds prepared by the method described above from the appropriate starting materials. Each compound was tested and found to exhibit fungicidal activity.

m-Chlorobenzyl 1,1,5-trihydroperfluoroamyl sulfide, B.P. 76–78°/0.02 mm.

Analysis.—Calcd. for $C_{12}H_9ClF_8S$ (percent): C, 38.7; H, 2.4. Found (percent): C, 38.9; H, 2.

p-Chlorobenzyl 1,1,7-trihydroperfluoroheptyl sulfide, B.P. 96–98°/0.02 mm.

Analysis.—Calcd. for $C_{14}H_9ClF_{12}S$ (percent): C, 35.6; H, 1.9. Found (percent): C, 35.6; H, 1.8.

p-Chlorobenzyl 1,1,3-trihydroperfluoropropyl sulfide, B.P. 77–79°/0.25 mm.

Analysis.—Calcd. for $C_{10}H_9ClFS$ (percent): C, 44.0; H, 3.3. Found (percent): C, 44.6; H, 3.3.

3-phenylpropyl 1,1,5-trihydroperfluoroamyl sulfide, B.P. 85–87°/0.05 mm.

Analysis.—Calcd. for $C_{14}H_{14}F_8S$ (percent): C, 45.9; H, 3.8. Found (percent): C, 46.1; H, 4.0.

α-Phenethyl 1,1,5-trihydroperfluoroamyl sulfide, B.P. 64–66°/0.06 mm.

Analysis.—Calcd. for $C_{13}H_{12}F_8S$ (percent): C, 44.3; H, 3.4. Found (percent): C, 44.4; H, 3.6.

p-Chlorobenzyl 1,1-dihydroperfluorobutyl sulfide, B.P. 61–62°/0.2 mm.

Analysis.—Calcd. for $C_{11}H_8ClF_7S$ (percent): C, 38.8; H, 2.5. Found (percent): C, 38.8; H, 2.3.

α-Naphthylmethyl 1,1,5-trihydroperfluoroamyl sulfide, B.P. 111–114°/0.02 mm.

Analysis.—Calcd. for $C_{16}H_{12}F_8S$ (percent): C, 49.5; H, 3.1. Found (percent): C, 49.4; H, 3.0.

p-Xylylyl 1,1,5-trihydroperfluoroamyl sulfide, B.P. 74–77°/0.03 mm.

Analysis.—Calcd. for $C_{13}H_{12}F_8S$ (percent): C, 44.3; H, 3.4. Found (percent): C, 44.6; H, 3.4.

p-Chlorobenzyl 2,2,2-trifluoroethyl sulfide, B.P. 52.5–54° C./0.06 mm.

Analysis.—Calcd. for $C_9H_8ClF_3S$ (percent): C, 44.9; H, 3.3. Found (percent): C, 45.0; H, 3.3.

p-Chlorobenzyl 1,1-dihydroperfluorobutyl sulfide, B.P. 61–62° C./0.2 mm.

Analysis.—Calcd. for $C_{11}H_8ClF_7S$ (percent): C, 38.8; H, 2.5. Found (percent): C, 38.8; H, 2.3.

EXAMPLE 2

A solution of 20 g. of 3,4-dichlorobenzyl chloride in benzene was added to a solution of 11 g. of triethylamine and 25 g. of 1,1,5-trihydroperfluoropentyl mercaptan in benzene. The resulting mixture was refluxed for three hours. The reaction mixture was washed well with water. The resulting benzene solution was dried and evaporated in vacuo. The residue was subjected to vacuum distillation. 3,4-dichlorobenzyl 1,1,5-trihydroperfluoroamyl sulfide was collected from 97–99°/0.12 mm.

Analysis.—Calcd. for $C_{12}H_8Cl_2F_8S$ (percent): C, 35.4; H, 2.0. Found (percent): C, 35.4; H, 1.9.

EXAMPLE 3

The following list of compounds is provided to illustrate the scope of the invention.

p-Xylylyl 1,1,5-trihydroperfluoroamyl sulfide
p-Methoxybenzyl 1,1,5-trihydroperfluoroamyl sulfide
p-Chlorobenzyl 1,1-dihydroperfluorobutyl sulfide
Benzyl 1,1,3-trihydroperfluoropropyl sulfide
o-Chlorobenzyl 1,1,5-trihydroperfluoroamyl sulfide
m-Chlorobenzyl 1,1,5-trihydroperfluoroamyl sulfide
p-Chlorobenzyl 1,1,5-trihydroperfluoroamyl sulfide
p-Chlorobenzyl 2,2,2-trifluoroethyl sulfide
α-Phenethyl 1,1,5-trihydroperfluoroamyl sulfide
β-Phenethyl 1,1,5-trihydroperfluoroamyl sulfide
3-phenylpropyl 1,1,5-trihydroperfluoroamyl sulfide
2,6-dichlorobenzyl 1,1,5-trihydroperfluoroamyl sulfide
p-Chlorobenzyl 1,1-dihydroperfluoroamyl sulfide
3,4-dichlorobenzyl 1,1,5-trihydroperfluoroamyl sulfide
3,4-dichlorobenzyl 1,1-dihydroperfluoroamyl sulfide
3,4-dichlorobenzyl 1,1-dihydroperfluorobutyl sulfide
m-Chlorobenzyl 1,1,7-trihydroperfluoroheptyl sulfide
p-Nitrobenzyl 1,1,5-trihydroperfluoroamyl sulfide
α-Naphthylmethyl 1,1,5-trihydroperfluoroamyl sulfide
α-(4-bromonaphthyl)methyl 1,1,5-trihydroperfluoroamyl sulfide
2,4-dichlorobenzyl 1,1,5-trihydroperfluoroamyl sulfide
p-Fluorobenzyl 1,1,5-trihydroperfluoroamyl sulfide
p-Bromobenzyl 1,1,5-trihydroperfluoroamyl sulfide
5-bromo-2,4-dimethylbenzyl 1,1,5-trihydroperfluoroamyl sulfide
2,4,6-trimethylbenzyl 1,1-dihydroperfluorobutyl sulfide
Pentamethylbenzyl 1,1,5-trihydroperfluoroamyl sulfide
p-Chlorobenzyl 1,1-dihydroperfluoroheptyl sulfide
2-phenylbutyl 1,1-dihydroperfluorobutyl sulfide
5-phenylhexyl 1,1,5-trihydroperfluoroamyl sulfide

EXAMPLE 4

Description of test for determining fungicidal activity

Each compound to be tested was diluted and added to sterile soil in a sealed soil blender and mixed therein for a specified period of time. A standardized quantity of the *Sclerotium rolfsii* fungus was added on a dry weight basis to the chemically treated soil and mixed thoroughly therein. The resulting blend of Sclerotium-inoculated and chemically-treated soil was portioned into suitable containers; two carrot slices were implanted therein. The containers were water sealed to prevent loss of potential chemical vapor phase and placed in the greenhouse for subsequent observation.

Five days after inoculation, disease severity was determined by actual counts of infection loci on carrot slices in Sclerotium-inoculated soil with no chemical and compared to equivalent counts on carrot slices in chemically treated and inoculated soil. At a concentration of 50 parts per million each of the compounds tested completely inhibited infection. Each compound was similarly applied to cotton, tomatoes, beans, cucumbers, sweet potatoes and peanuts at a rate of 100 pounds per acre, such rate being in considerable excess over that required to achieve control of the fungal pathogen. In no case were phytotoxic symptoms noted.

The following compounds were found to have a particularly high degree of activity in the above described test:

p-Chlorobenzyl 1,1,5-trihydroperfluoroamyl sulfide
m-Chlorobenzyl 1,1,5-trihydroperfluoroamyl sulfide
o-Chlorobenzyl 1,1,5-trihydroperfluoroamyl sulfide
2,4-dichlorobenzyl 1,1,5-trihydroperfluoroamyl sulfide
3,4-dichlorobenzyl 1,1,5-trihydroperfluoroamyl sulfide
2,6-dichlorobenzyl 1,1,5-trihydroperfluoroamyl sulfide
p-Bromobenzyl 1,1,5-trihydroperfluoroamyl sulfide
p-Fluorobenzyl 1,1,5-trihydroperfluoroamyl sulfide
β-Phenethyl 1,1,5-trihydroperfluoroamyl sulfide
Benzyl 1,1,5-trihydroperfluoroamyl sulfide
p-Chlorobenzyl 1,1-dihydroperfluorobutyl sulfide
2-(p-chlorophenyl)ethyl 1,1,5-trihydroperfluoroamyl sulfide While all of the compounds defined hereinabove by formula exhibit fungicidal activity, it is to be understood that some are more highly effective than others. The above-listed compounds are examples of preferred embodiments which exhibit high fungicidal activity and minimal phytotoxicity.

What is claimed is:

1. A method for inhibiting the growth of the fungus *Sclerotium rolfsii* which comprises applying to said fungus a compound of the formula:

$$Ar-alk-S-CH_2-(CF_2)_m-X$$

wherein Ar— is

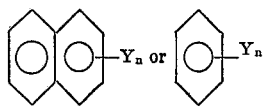

—alk— is an alkylene radical having from 1 to 6 carbon atoms, $m$ is an integer from 1 to 8, X is hydrogen or fluoride, Y is hydrogen, lower alkyl, lower alkoxy, halo or nitro and $n$ is an integer from 1 to 5 in an amount effective to inhibit the growth thereof.

2. A method according to claim 1 in which Ar— in the compound is

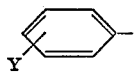

$m$ is 2 to 4, —alk— is methylene and Y is hydrogen or halogen.

3. A method according to claim 1 in which Ar— in the compound is

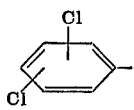

—alk— is methylene and $m$ is 2 to 4.

4. A method according to claim 1, in which Ar— in the compound is

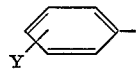

—alk— is ethylene, and $m$ is 2 to 4.

5. A method according to claim 1, in which Ar—alk— in the compounds is benzyl or chlorobenzyl, X is H and $m$ is 4.

6. A method according to claim 1 wherein the compound is p-chlorobenzyl 1,1,5-trihydroperfluoroamyl sulfide.

7. A method according to claim 1 wherein the compound is m-chlorobenzyl 1,1,5-trihydroperfluoroamyl sulfide.

8. A method according to claim 1 wherein the compound is benzyl 1,1,5-trihydroperfluoroamyl sulfide.

References Cited

UNITED STATES PATENTS

| | | | |
|---|---|---|---|
| 2,108,606 | 2/1938 | Muller et al. | 260—609E |
| 2,557,519 | 6/1951 | Skinner et al. | 260—609E |
| 3,006,964 | 10/1961 | Oesterling | 260—609A |

ALBERT T. MEYERS, Primary Examiner

V. D. TURNER, Assistant Examiner